Patented Jan. 14, 1941

2,228,929

UNITED STATES PATENT OFFICE 2,228,929

RECOVERING SURFACE ACTIVE COMPOUNDS CONTAINING POLYGLYCOL ETHER RADICLES

Bruno v. Reibnitz, Mannheim, Germany, assignor, by mesne assignments, to General Aniline & Film Corporation, New York, N. Y., a corporation of Delaware No Drawing. Application August 17, 1937, Serial No. 159,524. In Germany August 25, 1936

7 Claims. (Cl. 260—410)

The present invention relates to a process for recovering surface-active compounds containing polyglycol ether radicles.

The introduction of polyglycol ether chains into aliphatic or cycloaliphatic alcohols or carboxylic acids of high molecular weight leads to watersoluble compounds having excellent surface-active properties, as for example emulsifying, wetting and washing power. When, for the preparation of such products, there are used initial materials which, in addition to aliphatic or cycloaliphatic alcohols or carboxylic acids of high molecular weight, also contain other constituents which are difficult or impossible to remove, as for example hydrocarbons of high molecular weight, such as paraffin wax, paraffinic or cyclo-paraffinic oils, aldehydes or ketones, the resulting products are frequently inferior in their action to the pure products by reason of the presence of the impurities.

I have now found that from mixtures containing a polyglycol ether of hydroxyl containing compounds resulting from the oxidation of high molecular, non-aromatic hydrocarbons the said undesirable impurities can be removed in a simple manner by dissolving the mixtures in an organic water-insoluble solvent, adding a watersoluble organic solvent of low molecular weight and then adding while stirring such an amount of water that after allowing to stand layers are formed from the aqueous layer of which the polyglycol ether compound may be recovered. The term compound containing at least one hydroxyl group in the present case is intended to comprise alcohols as well as carboxylic acids.

As initial materials for the process according to this invention there may be mentioned for example mixtures containing compounds containing polygonal ethers which are obtainable for example by the action of alkylene oxides on mixtures containing alcohols and/or carboxylic acids, besides other constituents, as for example oxidation products of high molecular weight aliphatic hydrocarbons, such as hard or soft paraffin wax, paraffin oil, hydrogenation products of coals, tars, carbon oxides and the like. Products obtainable from the said oxidation products by reduction in the presence of catalysts, or from the products obtained from the said oxidation products after separation of the acid or saponifiable constituents and subsequent reduction may also be employed.

The recovery of the mixtures of compounds containing polyglycol ethers is effected for example by treating the mixtures containing alcohols and/or carboxylic acids with alkylene oxides, such as ethylene oxide, 1.2-propylene oxide, glycide, epichlorhydrin, diglycol or triglycol, advantageously in the presence of substances having an alkaline reaction, such as sodium and potassium ethylate, caustic soda, soda, sodium acetate, or surface-active substances, such as bleaching earths or active carbons. The etherification proceeds with a varying degree of facility according to the nature of the alcohols and carboxylic acids present. Some of the alcohols and acids react rapidly and others slowly or not at all with the alkylene oxides, so that in the final product there are not only the polyglycol ethers but also more or less large amounts of insoluble compounds and in particular also unchanged water-insoluble hydroxyl compounds which considerably impair the surface-active properties of the polyglycol ethers; the latter fact may be ascertained because the products do not give clear solutions in water. The removal of the said compounds by dissolving the product in water and separating the constituents insoluble in water is not directly possible by reason of the high emulsifying power of the ethoxylation products.

As water-insoluble solvents to be used according to this invention there may be mentioned for example benzine, benzene and its homologues, ethers, alcohols of high molecular weight, chlorohydrocarbons and carboxylic acid esters. As watersoluble solvents there may be mentioned for example alcohols of low molecular weight and acetone. The process may be carried out at ordinary, reduced or elevated temperature, in the latter case the temperature employed shall not surpass the boiling point of solvents used.

The aqueous layer containing the polyglycol ether compounds formed according to this invention, which also contains the watersoluble organic solvent, is run off and extracted one or more times in the usual manner with the same or another water-insoluble solvent. The combined extracts contain the impurities and the water-insoluble hydroxyl compounds. The polyglycol ether compounds are obtained in a pure form after distilling off the solvent and water. They are valuable surface-active compounds which are particularly suitable as dispersing, wetting, washing agent or as protective colloid in the textile and other industries.

In many cases the extraction is considerably simpler when the major portion of the polyglycol ether compounds, in particular the highly hydroxyalkylated constituents, are separated from the less highly hydroxyalkylated constituents and the impurities by treatment with selective organic solvents without the addition of water and alcohol. Solvents suitable for this purpose are for example especially aliphatic and cycloaliphatic hydrocarbons of low molecular weight, such as petroleum fractions, benzine and cyclohexane. Other solvents may, however, also be used, as for example ethyl ether and acetone. Aromatic and chlorinated hydrocarbons are less suitable because their solvent power is generally speaking too great. The most suitable solvent in any particular case may readily be ascertained by a preliminary experiment.

The extraction may be carried out in various ways. The products may be stirred at ordinary, elevated or reduced temperature with the solvent, or otherwise worked up by suitable mechanical means. The whole is then allowed to settle, the product being deposited in a liquid or solid form depending on the temperature and the melting point of the polyglycol ether compound. The separation may be effected by decantation, filtration, centrifuging or other suitable method. If necessary the said treatment may be repeated one or more times. The separation of the valuable compounds of a low degree of hydroxyalkylation which have passed into solution from the impurities is effected by the addition of the watersoluble solvent and water in the manner already described.

The said pretreatment is of advantage in that it offers the possibility of separating the initial material into compounds of high and low degrees of hydroxyalkylation, the capillary-active properties of which are different.

Furthermore the highly hydroxyalkylated constituents are obtained in an anhydrous state with but a slight content of organic solvents. Finally the subsequent extraction with the addition of water may be carried out with considerably smaller amounts of solvent, whereby a considerable saving in apparatus, time and material is obtained.

The following examples will further illustrate the nature of this invention but the invention is not restricted to these examples. The parts are by weight.

*Example 1*

314 parts of ethylene oxide are allowed to act on 100 parts of a methanol extract, hydrogenated according to Example 1 of U. S. patent specification No. 1,921,381, of the unsaponifiable constituents of oxidized hard paraffin wax having a hydroxyl value of 200. 100 parts of benzine having a boiling point of from 60° to 80° C. are added to 100 parts of the ethylene oxide condensation product while heating slightly. The benzine layer is removed and the residue again treated in the same way with 50 parts of benzine. The residue undissolved in the benzine contains 70 parts of a polyglycol ether which dissolves in water giving a clear solution and which has a very good emulsifying power and a very good capacity for dispersing calcium soaps.

The benzine solutions are combined and treated in a separating funnel with 50 parts of ethyl alcohol, about 25 parts of water being then added to the mixture while stirring at 35° C. Layers are thus formed. The lower layer is separated and again extracted with 50 parts of benzine. After evaporating the aqueous solution 16 parts of a viscous oil are obtained which is soluble in water giving a clear solution and which has a good washing action.

*Example 2*

110 parts of ethylene oxide are caused to react with 100 parts of the initial product having a hydroxyl value of 200 specified in Example 1. 100 parts of the resulting ethylene oxide condensation product are treated at ordinary temperature with 100 parts of ethyl ether and the said treatment is repeated with 50 parts of ether in the same way after separation of the ether. In this way 40 parts of a wax-like product are obtained which is readily soluble in water giving a clear solution and which has a good foaming power and an excellent cleansing action for domestic washing purposes.

The ether solutions are combined and the ether distilled off. The residue is dissolved in 100 parts of benzine and 50 parts of alcohol are added. After heating to 40° C. 20 parts of water are added while stirring, two layers thus being formed. The lower layer is separated and extracted twice, each time with 50 parts of benzine. After evaporating the aqueous solution, 30 parts of an oil are obtained the aqueous solutions of which have good washing and foaming power.

*Example 3*

A product having an acid value of 78 and a hydroxyl value of 36 obtained from hard paraffin wax by oxidation with air is distilled in vacuo. The first 60 per cent of the distillate are collected separately. After adding 1 part of sodium ethylate to 100 parts thereof, the latter are reacted at 150° C. with 110 parts of ethylene oxide. The product obtained is extracted three times at 40° C., each time with 150 parts of benzine (boiling point from 60° to 80° C.). The residue insoluble in benzine contains 100 parts of a product soluble to give clear solutions in water which has a good emulsifying power and a good power for dispersing calcium soaps.

The benzine solutions are united and introduced into a separating funnel. 100 parts of ethyl alcohol are added and then 40 parts of water are introduced while stirring at 35° C. A formation of layers thus takes place. The lower aqueous-alcoholic layer is separated and extracted twice more with 100 parts of benzine each time in the same manner. After evaporating the aqueous alcohol, there are obtained 60 parts of a viscous oil soluble in water to give a clear solution which has a good washing and emulsifying power.

What I claim is:—

1. The process for recovering surface-active water-soluble aliphatic compounds containing polyglycol ether radicles from mixtures containing the same besides water-insoluble substances which comprises dissolving mixtures containing a polyglycol ether produced by the introduction of polyglycol ether radicles into hydroxyl containing compounds resulting from the oxidation of high molecular, non-aromatic hydrocarbons in a water-insoluble organic solvent for fats, adding a water-soluble organic solvent of low molecular weight being a liquid aliphatic oxygen containing compound and then adding while stirring such an amount of water that after allowing to stand layers are formed, from the aqueous layer of which the polyglycol ether compound is recovered.

2. The process for recovering surface-active water-soluble aliphatic compounds containing polyglycol ether radicles from mixtures containing the same besides water-insoluble substances which comprises dissolving mixtures containing a polyglycol ether produced by the introduction of polyglycol ether radicles into hydroxyl containing compounds resulting from the oxidation of high molecular, non-aromatic hydrocarbons at a temperature below the boiling point of the solvents to be employed in a water-insoluble organic solvent for fats, adding a water-soluble organic solvent of low molecular weight being a liquid aliphatic oxygen containing compound and then adding while stirring such an amount of water that after allowing to stand layers are formed, from the aqueous layer of which the polyglycol ether compound is recovered.

3. The process for recovering surface-active water-soluble aliphatic compounds containing polyglycol ether radicles from mixtures containing the same besides water-insoluble substances which comprises dissolving a mixtures containing a polyglycol ether produced by the introduction of polyglycol ether radicals into alcohols resulting from oxidized high molecular, non-aromatic hydrocarbons at a temperature below the boiling point of the solvents to be employed in a water-insoluble organic solvent for fats, adding a water-soluble organic solvent of low molecular weight being a liquid aliphatic oxygen containing compound and then adding while stirring such an amount of water that after allowing to stand layers are formed, from the aqueous layer of which the polyglycol ether compound is recovered.

4. The process for recovering surface-active water-soluble aliphatic compounds containing polyglycol ether radicles from mixtures containing the same besides water-insoluble substances which comprises dissolving mixtures containing polyglycol ether esters of a carboxylic acid resulting from the oxidation of high-molecular, non-aromatic hydrocarbons at a temperature below the boiling point of the solvents to be employed in a water-insoluble organic solvent for fats, adding a water-soluble organic solvent of low molecular weight being a liquid aliphatic oxygen containing compound and then adding while stirring such an amount of water that after allowing to stand layers are formed, from the aqueous layer of which the polyglycol ether compound is recovered.

5. The process for recovering surface-active water-soluble aliphatic compounds containing polyglycol ether radicles from mixtures containing the same besides water-insoluble substances which comprises dissolving mixtures containing a polyglycol ether produced by the introduction of polyglycol ether radicals into hydroxyl containing compounds resulting from the oxidation of high molecular, non-aromatic hydrocarbons in a water-insoluble organic solvent for fats selected from the class consisting of benzine and benzene hydrocarbons, halogenated hydrocarbons, high-molecular alcohols, ethers and carboxylic acids, adding a water-soluble organic solvent of low molecular weight selected from the class consisting of low molecular aliphatic alcohols and acetone, and then adding while stirring such an amount of water that after allowing to stand layers are formed, from the aqueous layer of which the polyglycol ether compound is recovered.

6. The process for recovering surface-active water-soluble aliphatic compounds containing polyglycol ether radicles from mixtures containing the same besides water-insoluble substances which comprises dissolving a product obtained by causing a low-molecular alkylene oxide to react with an oxidation product of high molecular non-aromatic hydrocarbons containing compounds selected from the group consisting of alcohols and carboxylic acids in a water-insoluble organic solvent for fats, adding a water-soluble organic solvent of low molecular weight being a liquid aliphatic oxygen containing compound and then adding while stirring such an amount of water that after allowing to stand layers are formed from the aqueous layer of which the polyglycol ether compound is recovered.

7. The process for recovering surface-active water-soluble aliphatic compounds containing polyglycol ether radicles from mixtures containing the same besides water-insoluble substances which comprises extracting mixtures containing a polyglycol ether produced by the introduction of polyglycol ether radicals into hydroxyl containing compounds resulting from the oxidation of high molecular, non-aromatic hydrocarbons with a selective organic solvent in order to remove the major part of the polyglycol ether compounds, then adding water while taking care that at least a water-insoluble and at least a water-soluble solvent and water are present in the mixture in such amounts that after allowing to stand layers are formed from the aqueous layer of which the polyglycol ether compound is recovered.

BRUNO V. REIBNITZ.